Aug. 19, 1969  P. H. HOBSON  3,461,597

ADJUSTABLE WEIGHT SINKER FOR FISHING LINES

Filed June 23, 1967

INVENTOR.

PHILIP H. HOBSON

BY

*Richard D. Law*

ATTORNEY

United States Patent Office 3,461,597
Patented Aug. 19, 1969

3,461,597
ADJUSTABLE WEIGHT SINKER FOR FISHING LINES
Philip H. Hobson, Box 742, Evergreen, Colo. 80439
Filed June 23, 1967, Ser. No. 648,268
Int. Cl. A01k 95/00
U.S. Cl. 43—43.14      6 Claims

ABSTRACT OF THE DISCLOSURE

A frame member having means for attachment to a fishing line including a weight holding elongated portion integral with the frame member at one end and having a releasable closure means at the other end, whereby annular-shaped weights may be mounted on the elongated portion of the frame member. The frame may be made of spring wire, having a safety-pin type catch in a position to engage the releasable closure means for releasably holding the weights on the elongated portion, and it includes an angled leading edge extending from the frame to the elongated portion to prevent hangup of the line on snags.

---

Sinkers for fishing lines are used for various types of fishing, for example, bait fishing, lure fishing, still fishing, casting, etc. Commonly used weights come in various sizes and are individually attached to the fishing line. The choice of weights is normally by a trial and error method. A weight of a particular size is chosen and fishing started, but if the weight chosen is not satisfactory, other weights are added or the chosen weight may be released and a different weight placed on the line, depending upon the desires of the user. The changing of the amount of weight on the line may be quite annoying and certainly time consuming.

According to the present invention I have provided a means for quickly and easily adjusting the weight on a fishing line. The invention provides a spring wire frame which may be attached to the line and retained for use with or without weights. The frame is provided with a safety pin type catch and a straight section which may hold a plurality of annular-shaped weights. The configuration of the frame is such as to hold the weights at a position spaced from the line when pulled through the water, which prevents twisting of the line in the event the lure on the end of the line tends to twist the line. The weights may be made of various sizes and are easily put on and taken off the frame means by undoing the safety type catch, placing the annular weights on or removing them from the frame means. The frame is arranged for easy attachment to the line by several means, and the frame is securely held by two points on the line.

Included among the objects and advantages of the invention is an adjustable weight system for a fishing line.

Another object of the invention is to provide a spring wire frame means having a safety pin type catch and a straight section arranged for holding a plurality of annular-shaped weights.

Another object of the invention is to provide a frame for holding multiple and variable weights at a point spaced from the fishing line so as to provide an anti-spinning arrangement for the fishing line.

A still further object of the invention is to provide a spring wire frame for holding variable weights for the fishing line, and including a reverse-biased leading edge of the frame to prevent snag of the weights in use.

These and other objects and advantages of the invention may be readily ascertained by referring to the following description and appended illustrations in which.

Figure 1:
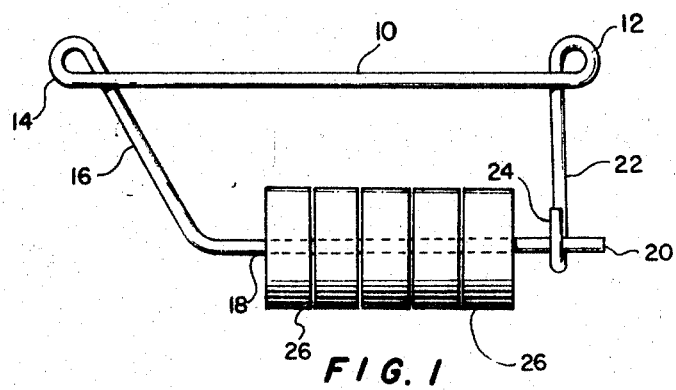
FIG. 1 is a side elevational view of a frame and carried annular weights for a fishing line, according to the invention.
Figure 2:
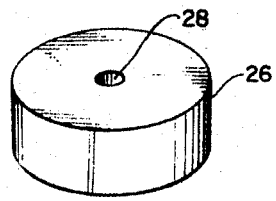
FIG. 2 is a perspective view of one form of weight for use with the frame of the invention.

In the form of the device selected for illustration, a wire frame includes a straight section 10 with a loop 12 at one end and a loop 14 at the opposite end. The wire portion 16 continuing from the loop 14 extends at an angle to a straight section 18 which terminates in an end 20. The wire continuing from the loop 12 extends downwardly at a right angle to the section 18, and the end is bent back on itself so that it terminates in a hook 24 into which the end 20 may cradle, closing the frame. The wire is preferably a non-corrosive wire sufficiently tempered to allow bending and with sufficient spring to tightly seat in the hook 24 when closed. The wire at the loops 12 and 14 preferably contacts itself, forming a closed loop, and the loops or eyelets may be completely closed by soldering, welding the wires, etc. The wire frame may, of course, be plated, as for example, chrome plated. A plurality of annular shaped weights 26 having a central opening 28 may be placed on the straight section 18 by unhooking the end 20 and placing the sinkers or weights on the portion 18 of the clip. The end 20 is then placed in the hook 24 and the spring action of the clip maintains the end 20 in the hook and retains the sinkers or weights in place on the clip. Various sizes, both in diameter and in width of the annular weights, may be used to provide a variable amount of weight for the clip. The weights may, likewise, be plated to form a fish-attracting feature along with the clip.

Figure 3:
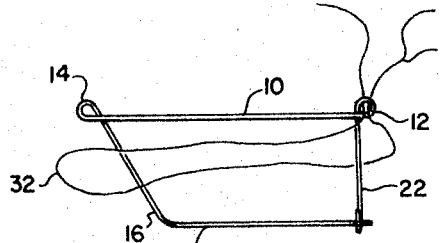
FIG. 3 is a generally schematic view of a weight frame according to the invention, illustrating one step in one method of attaching the frame to the line.
Figure 4:
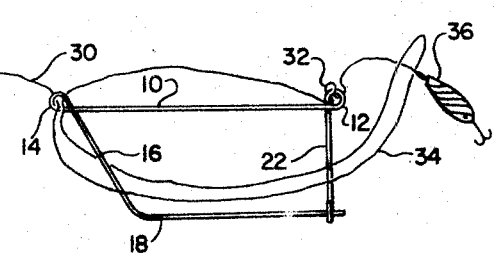
FIG. 4 is a schematic view of a weight frame according to the invention, illustrating a second step in the attachment of the frame of the invention to a fishing line.
Figure 5:
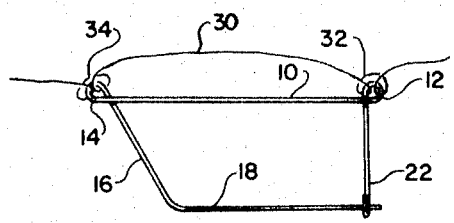
FIG. 5 is a schematic side elevation showing the final step in the attachment of the line to the frame.

One method of attaching the clip to the line is shown in FIGS. 3 and 4 where a line 30 is pulled through eyelet 12 as a loop 32 which is passed around the clip over the end with eyelet 14, and is then pulled tight in a loop down on the eyelet 12. The line is then pulled through the eyelet 14 in another loop 34 which is passed around the clip over the end of the line, which may include a lure 36, and is pulled into a loop around the eyelet 14. In this manner the clip may be placed on a line, even with bait or a lure attached to the end of the line. Another method of attaching the clip to the line is to pull the end of the line through the eyelet, tie a knot, pass the same end through the other eyelet, pull it tight and form a knot, which generally permanently attaches the frame to the line. The end of the line may then be secured to bait, a lure or the like for use. Once the frame is attached to the line, the number of weights desired may be changed as desired.

The clip may be retained on the line without weights with very little hindrance in the use of the fish line. It is noted that the weights are eccentric on the line, which prevents twisting when spinners or other rotating lures are used. Further, the clip may be made in various sizes for accommodating different sizes of weights and for different types of fishing. The spring tension of the member 18 in the hook 24 maintains the weights secured to the clip. The line leading to the pole should be attached to the eyelet 14 so that in drawing the sinker through the water the biased frame portion 16 is the leading edge of the frame, which reduces the probability of catching the clip on snags in the water. The angle between the perpendicular line to member 18 and the member 16 may be from 30° to 60° and is preferably about 45° to provide a biased member which will slide over most snags with which it comes in contact.

I claim:

1. A fishing line sinker comprising wire frame means having ends defining means for at least two points of attachment to a fishing line at spaced-apart position; an elongated wire member integral with said frame means, said wire member extending at an angle from one frame end to a continuation spaced from and extending generally parallel to said frame means; hook means depending from the opposite end of said frame means in position to hook over the end of said elongated member continuation and retain the same in said generally parallel position; and a selected number of apertured cylindrical weights being disposed on said elongated member continuation so as to be positioned at a distance from said fishing line and generally parallel thereto.

2. A fishing line sinker according to claim 1 wherein said frame means is formed from spring wire.

3. A fishing line sinker according to claim 2 wherein said means for attachment are two eyelets formed in said wire frame means.

4. A fishing line sinker according to claim 2 wherein said weights have an axial aperture therethrough.

5. A fishing line sinker according to claim 2 wherein said hook means is a wire extension from said frame means extending generally perpendicular thereto.

6. A fishing line sinker according to claim 1 wherein said frame means is a one-piece, a spring wire including a generally straight length and said ends comprise eyelets formed by bending the wire about 270°; said elongated wire member depending from a first eyelet at an acute angle relative to said straight length in the direction of said straight length; said hook means comprising a wire portion depending perpendicularly from the second eyelet on said straight length with its end bent back along itself forming a hook in position to mate with the end of said elongated wire member continuation in hooking relation.

References Cited

UNITED STATES PATENTS

| | | | |
|---|---|---|---|
| 2,565,163 | 8/1951 | Ball | 43—43.1 |
| 2,589,715 | 3/1952 | Lysikowski | 43—43.14 |
| 2,735,212 | 2/1956 | Baum | 43—43.12 |

ALDRICH F. MEDBERY, Primary Examiner

D. J. LEACH, Assistant Examiner

U.S. Cl. X.R.

43—43.13, 44.97